US008382341B2

(12) United States Patent
Peter

(10) Patent No.: US 8,382,341 B2
(45) Date of Patent: Feb. 26, 2013

(54) MOUNTING ASSEMBLY

(75) Inventor: David S. Peter, Goodyear, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 207 days.

(21) Appl. No.: 13/023,730

(22) Filed: Feb. 9, 2011

(65) Prior Publication Data

US 2012/0026744 A1 Feb. 2, 2012

Related U.S. Application Data

(60) Provisional application No. 61/369,097, filed on Jul. 30, 2010.

(51) Int. Cl.
*B60Q 1/00* (2006.01)
*B42F 13/00* (2006.01)

(52) U.S. Cl. ......................... 362/370; 362/371; 248/343

(58) Field of Classification Search ........................ None
See application file for complete search history.

(56) References Cited

U.S. PATENT DOCUMENTS

| | | | | |
|---|---|---|---|---|
| 6,224,233 | B1 * | 5/2001 | Fischer et al. | 362/368 |
| 7,766,518 | B2 * | 8/2010 | Piepgras et al. | 362/373 |
| 8,215,920 | B2 * | 7/2012 | Criner et al. | 248/343 |

* cited by examiner

*Primary Examiner* — Anh Mai
*Assistant Examiner* — Britt D Hanley

(57) ABSTRACT

A luminaire mounting assembly comprises a mounting bracket having at least one keyed aperture, the mounting bracket having one of a slider assembly and at least one tab, a fixture housing having the other of a slider assembly and the at least one tab, the slider assembly movable between a first fixture position and a second fixture position, the slider assembly having a fixed element, a plunger movable relative to the fixed element, the plunger biased toward a first plunger position and engaging the at least one tab, the plunger movable to a second plunger position to pass the at least one tab.

19 Claims, 9 Drawing Sheets

MOUNTING ASSEMBLY

CROSS-REFERENCE TO RELATED DOCUMENTS

This application claims priority to and benefit under 35 U.S.C. §119(e) to U.S. Provisional App. No. 61/369,097, filed on Jul. 30, 2010, the entire contents of the aforementioned application are herein incorporated by reference.

TECHNICAL FIELD

The present invention relates to a mounting assembly. More specifically, the present invention relates to a mounting assembly which may be utilized to mount various structures, such as light fixtures, from walls, ceilings or such structures.

BACKGROUND

Luminaire fixtures and other such structures which are connected to walls and ceilings are known to require servicing or maintenance. Existing luminaire fixtures have various problems in allowing these procedures. Most luminaires require removal of the outermost limbs and lamp in order to service wiring or electrical issues. Various fixtures require removal of multiple screws to remove a reflector. Certain fixtures utilize a locking spring clip inside a ballast compartment. Further, various fixtures require disassembly and uninstallation of the fixture to simply check wiring or provide other basic servicing. This, therefore, requires reinstallation of the fixture by fully reassembling the fixture. These disadvantages and risks are time consuming and can result in damage to the fixture or other structure being mounted. Additionally, personal injury may result to the service person or installer when handling a clip which is positioned inside a ballast compartment. There are various sharp edges known to exist within the metal forms used in defining luminaire fixtures and, additionally, these lamps have inherent risks known with voltages and high temperatures. Finally, warranties may be voided or internal portions of the fixture or electronics may be damaged due to the requirement that an installer or service person handle internal portions of the fixture in order to uninstall or remove the fixture from the ceiling or wall structure.

It would be highly desirable to provide a fixture which is easy to install and which overcomes these and other known deficiencies through the use of a mounting assembly structure to connect to a wall or ceiling to a luminaire or other mounted structure.

SUMMARY

A luminaire mounting assembly comprises a mounting bracket having at least one keyed aperture, the mounting bracket having one of a slider assembly and at least one tab, a fixture housing having the other of a slider assembly and the at least one tab, the slider assembly movable between a first fixture position and a second fixture position, the slider assembly having a fixed element, a plunger movable relative to the fixed element, the plunger biased toward a first plunger position and engaging the at least one tab, the plunger movable to a second plunger position to pass the at least one tab. The luminaire mounting assembly wherein the slider assembly is spring biased to the first plunger position and movable to the second plunger position. The luminaire mounting assembly wherein the tab engages the plunger at the first plunger position and forces the plunger to the second plunger position. The luminaire mounting assembly wherein the tab locks the plunger at a third plunger position. The luminaire mounting assembly further comprising a junction box connected to the mounting bracket. The luminaire mounting assembly further comprising a cover plate on the fixture assembly which covers the slider assembly.

A luminaire mounting assembly comprises a back plate disposed on a luminaire fixture, a mounting bracket movable relative to the back plate and having tabs extending from the mounting bracket, a slider assembly connected to the luminaire fixture, the slider assembly having a fixed end and a slider, the slider having a normal position and at least one biased position, one of the mounting bracket and the back plate movable to engage the slider in said normal position and urging the slider toward the biased position, the tab movable to a locked position when the tab rotates beyond the slider and the slider locks the mounting bracket in an operating position. The luminaire mounting assembly wherein the slider assembly having a biasing spring extending between the slider and the fixed end. The luminaire mounting assembly wherein the slider having a camming surface. The luminaire mounting assembly wherein the tab has a follower surface engaging the camming surface. The luminaire mounting surface further comprising a receiving portion on the mounting bracket. The luminaire mounting surface further comprising a cover plate disposed over the slider assembly. The luminaire mounting surface wherein a portion of the cover plate is received in the receiving portion.

A luminaire mounting assembly comprises a back plate disposed on a luminaire fixture, the back plate movable relative to a mounting bracket, the mounting bracket having at least one slider assembly, the luminaire having a tab wherein the at least one slider assembly engages the tab and compresses from a first position and to a second position, the slider assembly passing the tab in the second position with rotation of the slider assembly past the tab. The luminaire mounting assembly wherein the tabs continue rotating until the slider moves to a locked position. The luminaire mounting assembly wherein the tab and the slider have parallel locking surfaces. The luminaire mounting assembly wherein the mounting bracket has a junction box connected thereto. The luminaire mounting assembly wherein the mounting bracket tab engages a slider. The luminaire mounting assembly further comprising a cover disposed over the slider assembly and received by a receiving portion of the mounting bracket.

BRIEF DESCRIPTION OF THE ILLUSTRATIONS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
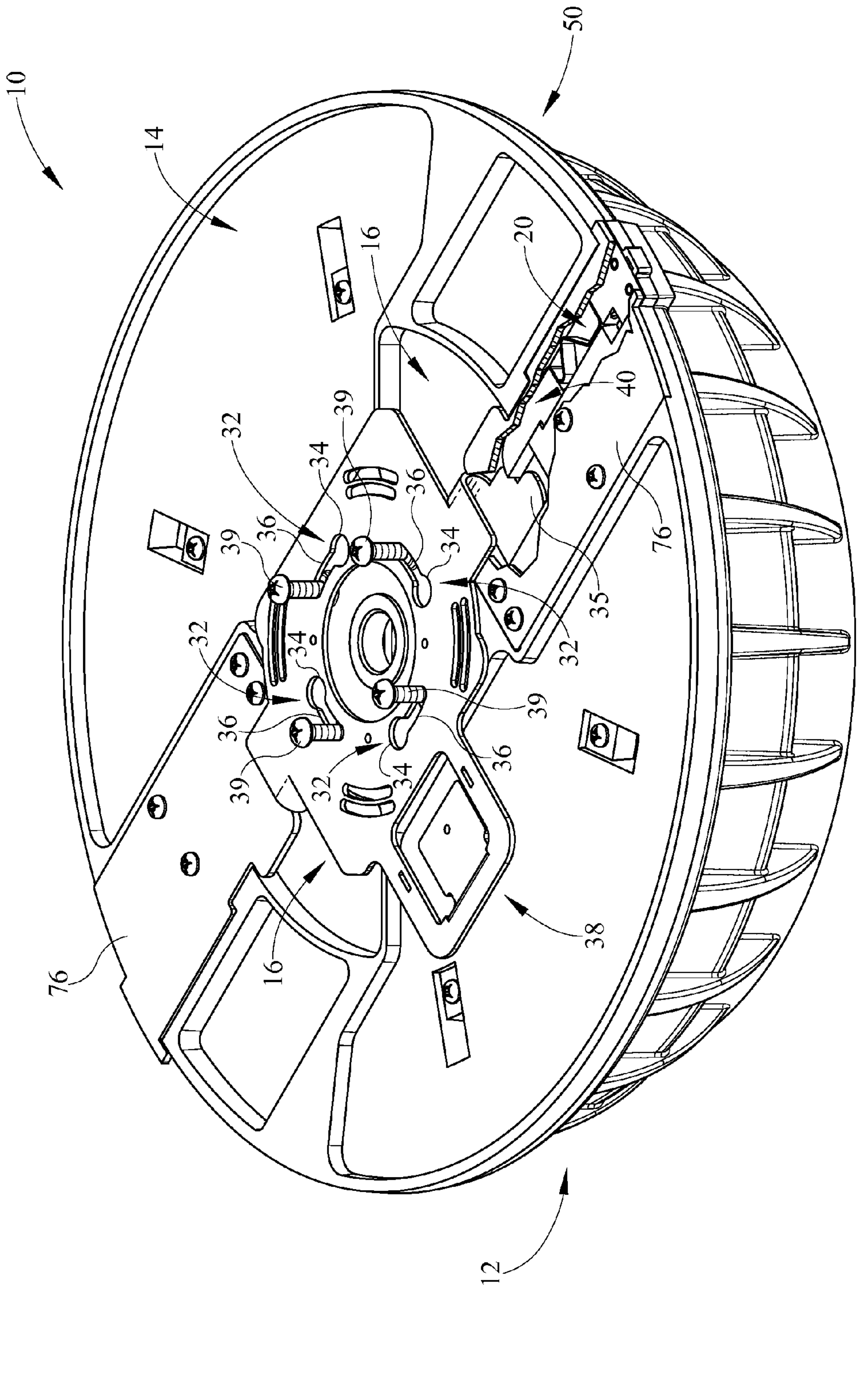
FIG. 1 depicts an upper perspective view of an exemplary mounting assembly connected to an exemplary fixture.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As shown throughout FIGS. 1-9, the various figures depict a mounting assembly. The exemplary mounting assembly of the present embodiment is utilized with a luminaire fixture. This structure allows for positioning of the fixture near the wall or ceiling and allows the installer to have full visibility for completion of the wiring. Once the wiring is completed, the fixture is aligned into position relative to a mounting bracket and rotated to a locked position. This provides for a simple installation feature which doesn't require deconstruction of the fixture in order to remove the fixture from the wall or ceiling. Additionally, the term fixture is used throughout this application and a light fixture is shown. However, the term fixture is not limited to light fixtures. For example, other types of mounted fixtures may be utilized with the mounting assembly such as: decorative accent pieces for homes and businesses, light fixtures that mount vertically or need flush mount to a slanted ceiling, learning display consoles at schools and colleges, for public utility with touch screen self-help consoles, wall mounted coin operated dispensers for vandal resistance, for public safety or security industry with camera installation, outdoor or indoor speaker mount systems, paper towel and soap dispensers at public bathrooms so that an entire product line can be removed or replaced for servicing. This list is not exhaustive as the mounting assembly may be utilized with other structures and purposes.

Figure 2:
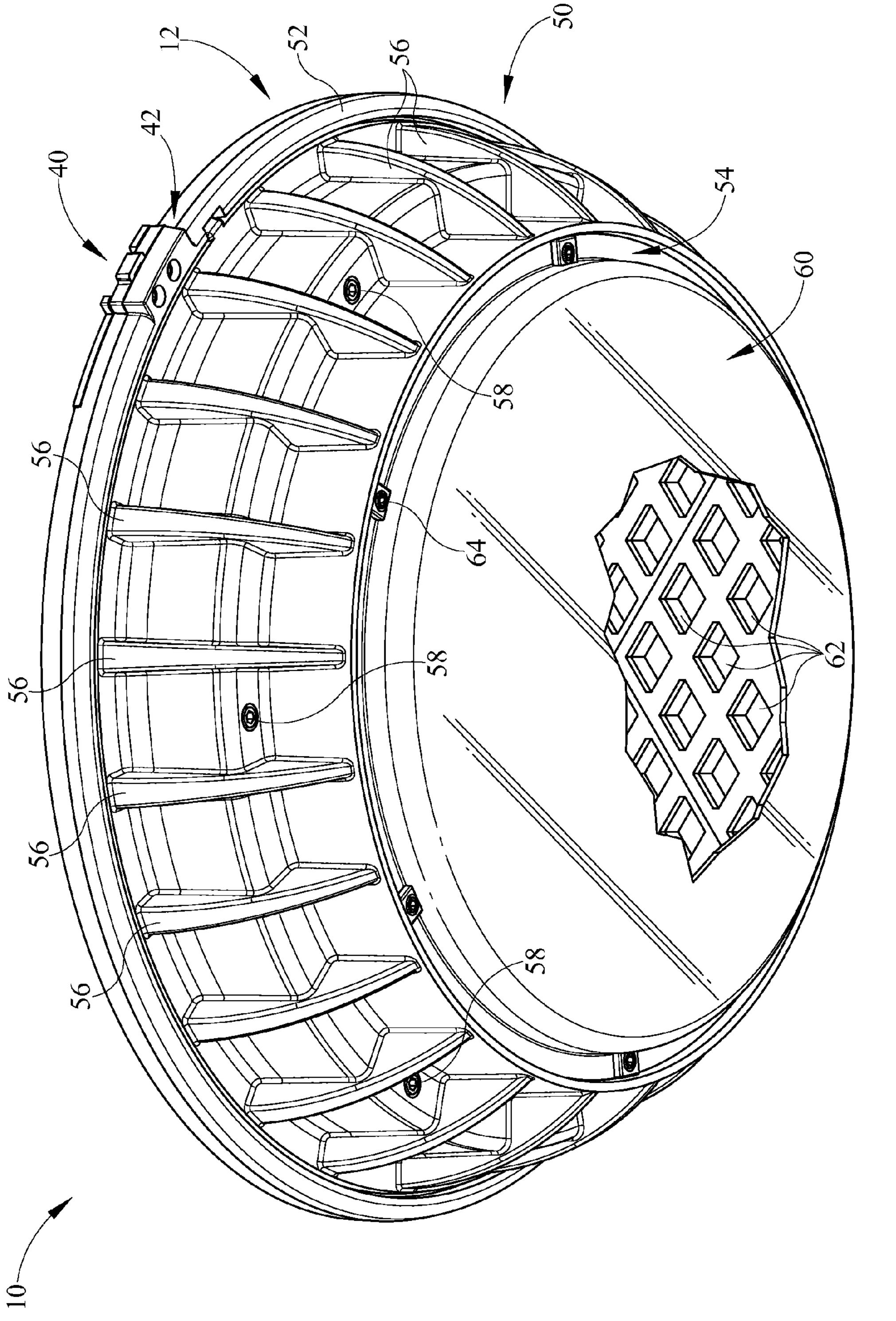
FIG. 2 is a lower perspective view of the exemplary fixture.
Figure 6:
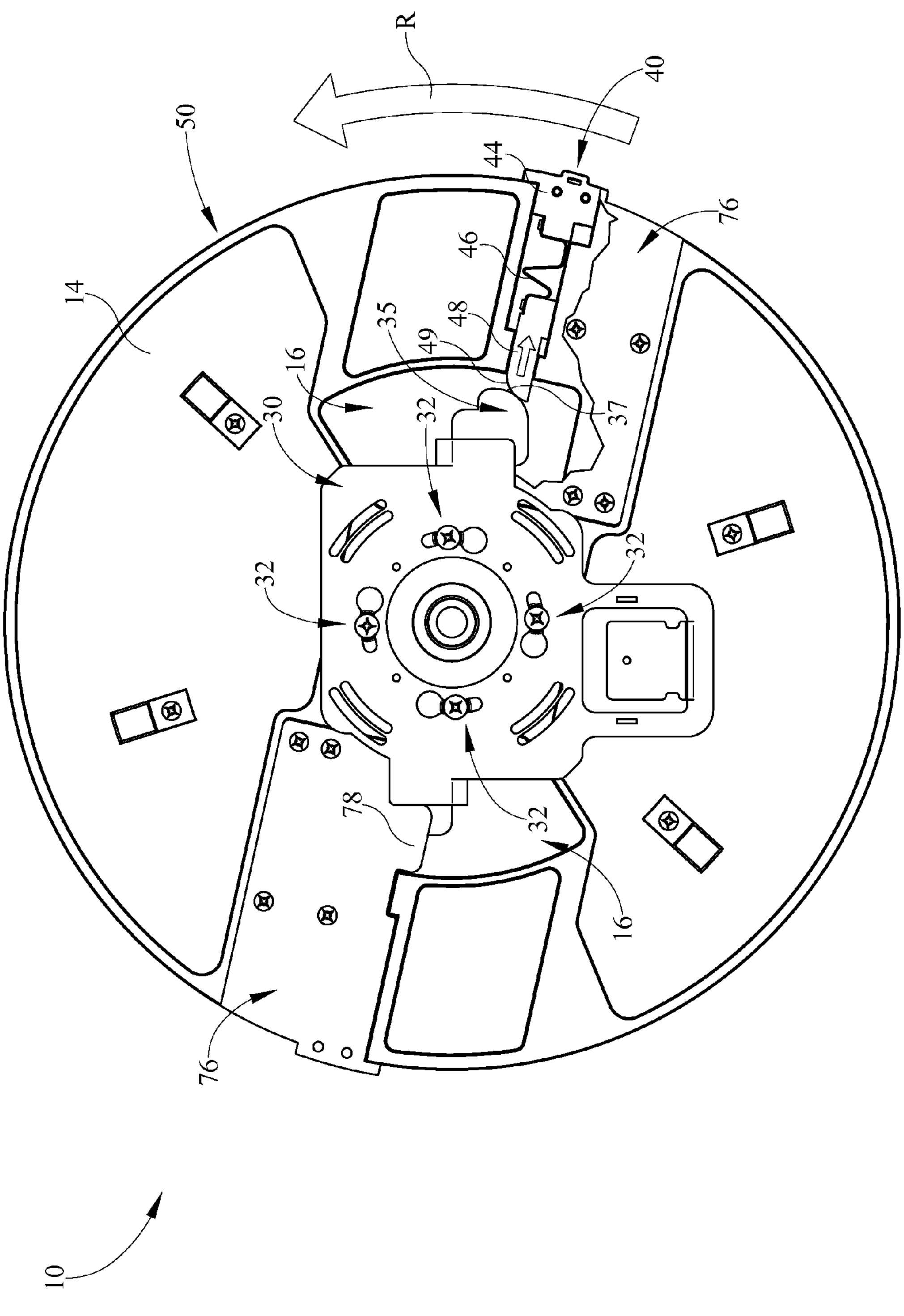
FIG. 6 is a top view of the exemplary mounting assembly in a second position.

Referring now to FIG. 1, an upper prospective view of the mounting assembly 10 retaining a luminaire fixture 12 is depicted from above the assembly 10. The fixture 12 may include a fixture housing or casing 50 depending from a backplate 14 and a lens 60 (FIG. 2). The mounting assembly 10 includes a bracket 30 and the backplate 14. The backplate 14 is shown as a circular shape which is molded or maybe metallic and pressed to form any of various shapes. The backplate 14 includes at least one cavity or recess 16 which allows for sliding motion of a bracket 30 therethrough. The backplate 14 also includes at least one recess 20 for slider assembly 40. The recess 20 allows positioning of the slider assembly 40 therein and movement of a slider 48 (FIG. 6). The recess 20 includes an opening into the recess 16 so that the slider can interact in that area of the backplate 14. In the exemplary embodiment, the slider assembly 40 is connected to the backplate 14 and the bracket 30 rotates relative to the backplate 14. Alternatively, the backplate 14 may rotate relative to the bracket 30. Either way, the bracket 30 moves with respect to the backplate 14 and slider assembly 20 through a preselected arcuate distance. At a preselected position, the bracket 30 will engage the slider assembly 20 until the backplate 14 and bracket 30 locked relative to one another.

The bracket 30 includes at least one keyed aperture 32. In the exemplary embodiment, the keyed apertures 32 have a larger circular opening 34 at one end and a slot 36 connected to the circular opening 34. The fasteners 39 are received in the circular portion 34 and moved over into the slot so that the head of the fastener inhibits removal of the bracket 30 therefrom. The slots 36 are arcuate and define a range of motion for the fasteners 39. The slots 36 may vary in length so that they are not limited to the length shown. Additionally, the openings 34 should be large enough to receive the fastener head and the slot 36 should be wider than the diameter of the shaft of fastener 39 to allow movement of the fastener 39 through the slot 36. This is merely one means for rotating the fixture 12 relative to the bracket 30 and one skilled in the art should understand that other means for connection and rotation may be utilized.

The bracket 30 includes a support 38 which is generally square in shape. Keeping in mind that the bracket 30 will be connected to a junction box in a wall or ceiling, the support 38 allows the fixture 12 to be supported in a hanging position from the bracket 30 in order to perform the wiring between the junction box (not shown), which is connected to the bracket 30 and the fixture housing 50 below the bracket 30. A wireway opening or pass-through is located in the center of the bracket 30. The wireway allows wiring to move from the junction box to the fixture components in the fixture 12.

Referring now to FIG. 2, a lower perspective view of fixture 10 is depicted along the top edge of the fixture 10; the slider assembly 40 is shown fastened to the housing 50. This creates a fixed or locked end 44 (FIG. 6) for the slider assembly 40 which is necessary for proper operation of the embodiment shown. The fixture housing or casing 50 includes an upper rim 52 and a lower seating area 54. Extending between the upper rim 52 and the seating area 54 are a plurality of ribs 56. These ribs serve two functions. The housing fixture 50 is formed of a metallic material, such as for example cast aluminum, in order to dissipate heat. However, alternate metals may be utilized. The fins 56 function as heat sinks to dissipate thermal energy and provide lower operating temperatures which results in longer life for the LEDs 68 shown in the cutout portion of the lens 60. The fins 56 also provide an aesthetically pleasing appearance for the fixture 12. Further, although LEDs are shown in the depicted embodiment, various types of luminaires may be used such as incandescent, fluorescent, halogen or other types of luminaires.

In the view depicted, the housing 50 includes a plurality of fasteners 58 disposed between the fins 56 and which extend upwardly. The fasteners 58 connect the backplate 14 (FIG. 1) to the housing 50. The lens 60 is connected to the seating area 54 by a plurality of lens fasteners 64.

Figure 3:
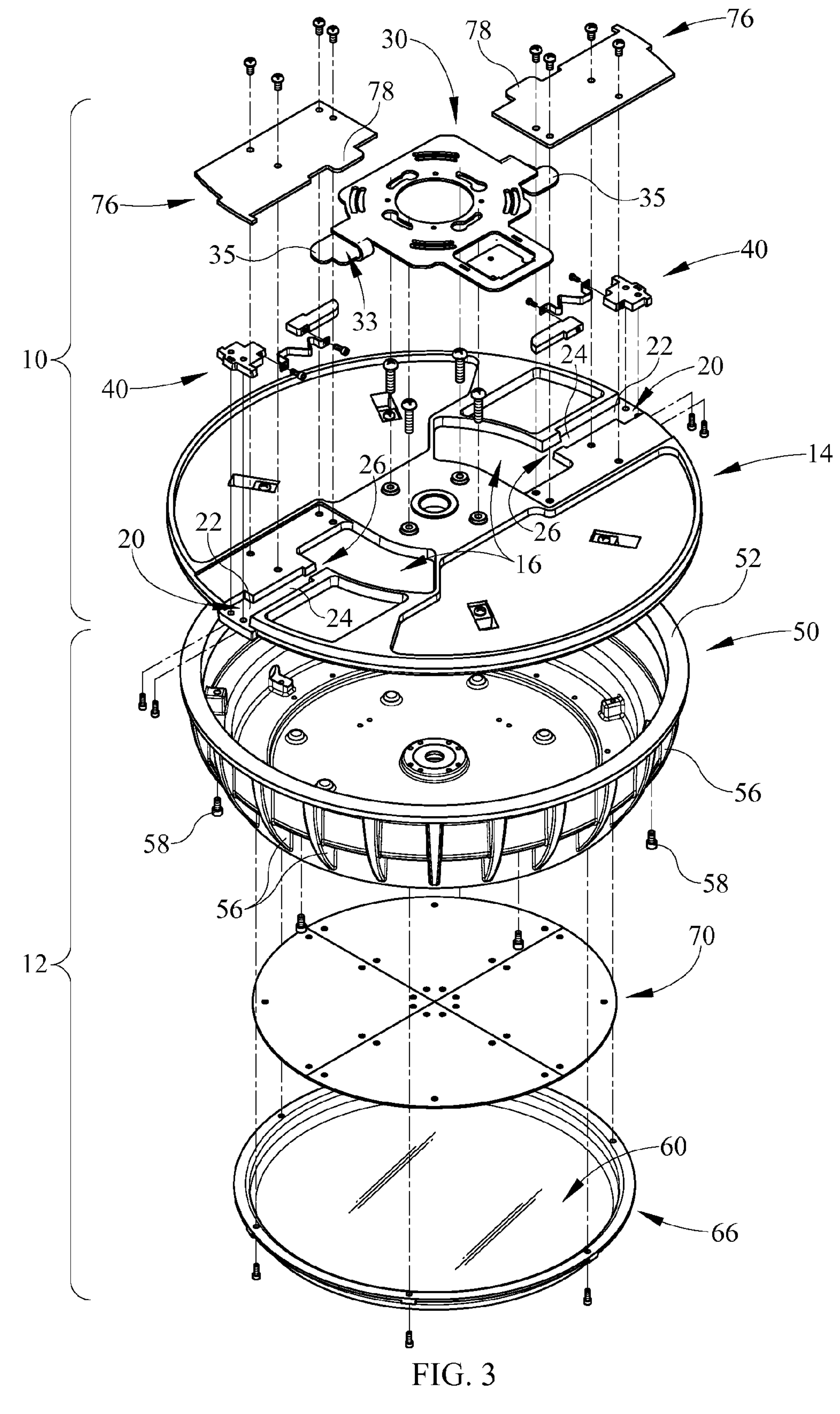
FIG. 3 is an exploded perspective view of the exemplary fixture including the exemplary mounting assembly.

Referring now to FIG. 3, an exploded perspective view of the assembly is depicted. Starting from the lower end, the lens 60 is shown and is surrounded by a lens frame 66. The lens frame is positioned in the seating area 54 (FIG. 2) of the fixture housing 50. The lens 60 may be formed of polycarbonate or other diffusive material.

Positioned above the lens 60 is an LED circuit board 70. According to the exemplary embodiment, the circuit board 70 is circular and is formed of four separate pie-shaped elements to provide a modular functionality. When any of the LED circuit board sections fail, that section may be replaced rather than replacing the entire circular circuit board. The circuit board 70 is a metal clad or t-clad LED type structure which is positioned against a lower most surface of the fixture housing 50 in order to transfer heat from the circuit board 70 into the fixture housing or casting 50. This allows for heat transfer through the casting 50 and the fins 56.

Above the circuit board 70 is a fixture housing 50. As previously discussed, the housing 50 is metallic and bowl shaped. The shape may vary depending on the type of fixture utilized. The housing 50 includes a plurality of fins 56 for thermal transfer.

Above the fixture casting 50 is the backplate 14 which is fastened to the fixture through backplate screws 58. The screws pass vertically through the housing 50 and into a depending boss or receiving implement on a lower surface of the backplate 14. The backplate includes the recess or cavity 16 which allows rotation of the backplate 14 relative to the bracket 30 or vice versa. The backplate 14 also includes a recess 20 for the slider assembly 40. The backplate includes two slider recesses 20 so that the slider assemblies 40 may be positioned opposite one another on the backplate 14, according to the exemplary embodiment. Each recess 20 includes a fixed end portion 22 and a channel 24 allowing for slideable motion of the slider or plunger 48 (FIG. 6). The channel 24 is in communication with the fixed end 22 portion of the recess 20. The recesses 16, are in communication with one another as will be discussed further herein. An opening 26 is located in the recess 16 allowing the slider or plunger 48 to move into and out of the recess 16. This allows engagement of the slider assembly 40 with the bracket 30 as one of the backplate 14 and bracket 30 rotates relative to the other of the backplate 14 and bracket 30.

Moving above the backplate 14 is the bracket 30 which is generally flat with a central aperture for alignment with a central aperture and a backplate 14. The bracket 30 includes two generally receiving structures 33 which are generally u-shaped along the side edges of the bracket 30. These receiving structures 33 further define a lower portion of which forms a tab 35. As described further herein, the tab 35 has a curvilinear surface 37 (FIG. 5) which acts as one of a cam or follower and the slider assembly 40 includes a curved surface which acts as the other of the cam or follower so that the bracket 30 moves the slider assembly 40 during rotation of one of the backplate 14 or the bracket 30. Once the tab 35 moves past the slider assembly 40, the mounting assembly 10 is locked.

Above the bracket 30 are cover plates 76. Each of the cover plates are fastened to the backplate 14 and cover the moveable portions of the slider assembly 40. Each of the cover plates 76 further comprises a support tab 78. When the bracket 30 is rotated relative to the backplate 14, or vice versa, to the locked position, the bracket 30 stops at a position relative to the backplate 14 wherein the tabs 35 proceed under the tabs 78. In a position depending from a ceiling, the tabs 35 can support the weight of the entire fixture 12 on the mounting assembly 10.

Figure 4:
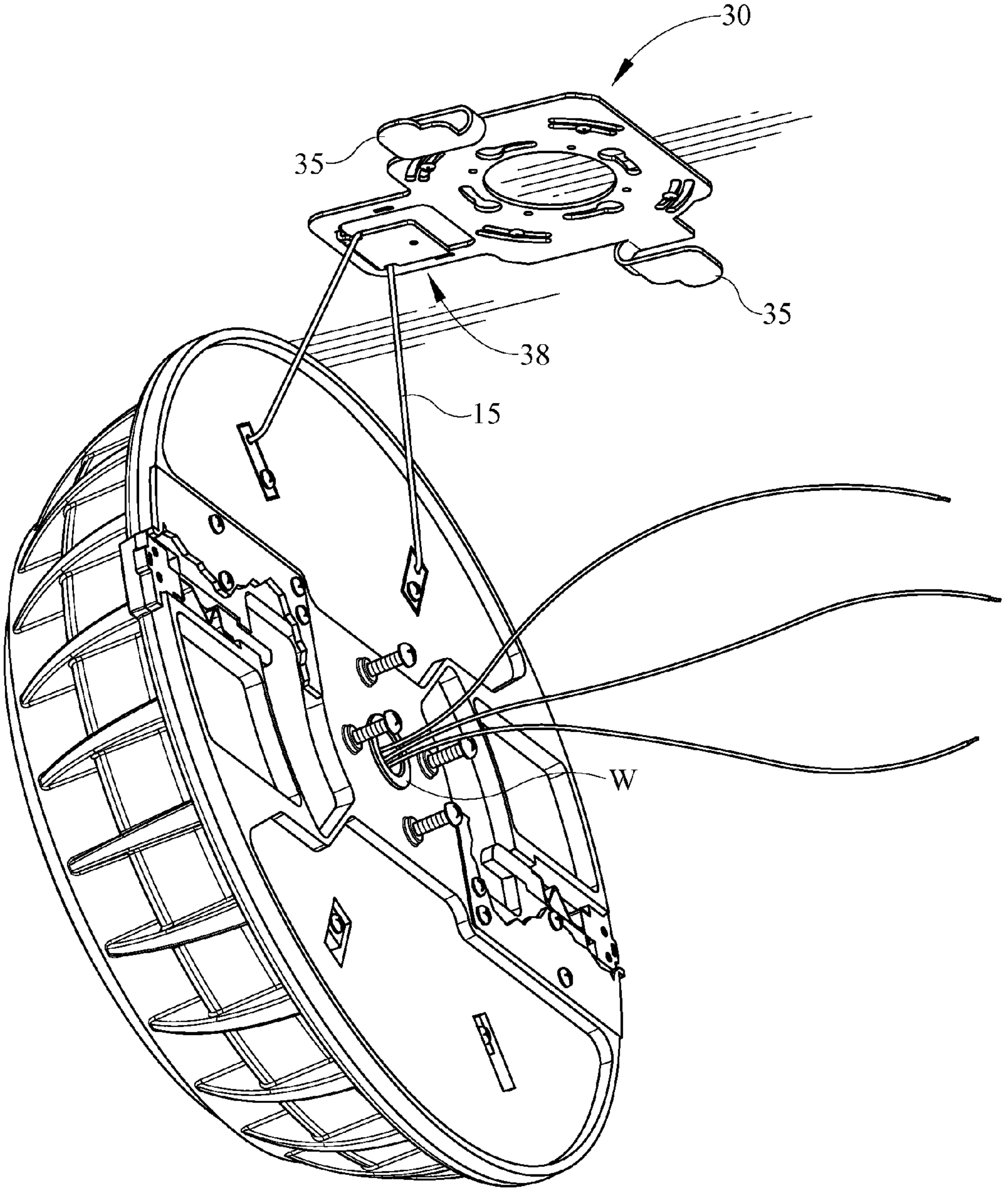
FIG. 4 is a perspective view of a mounting bracket and a fixture hung from the mounting bracket.

Referring now to FIG. 4, the fixture 12 is shown in a position suspended from the mounting bracket 30. The mounting bracket includes a support 38 having a clip portion or other supporting feature. The backplate 14 includes a plurality of fasteners for stringing a retaining cable 15. The cable may be, for example, aircraft cable. The cable 15 may be suspended from the support 38 of the mounting bracket 30, so that the fixture 12 hangs downwardly from the mounting bracket and allows for easy wiring of the fixture to the junction box, to which the mounting bracket 30 is connected. This also allows for hands free support of the fixture 12 so that such wiring may be conducted.

Figure 5:
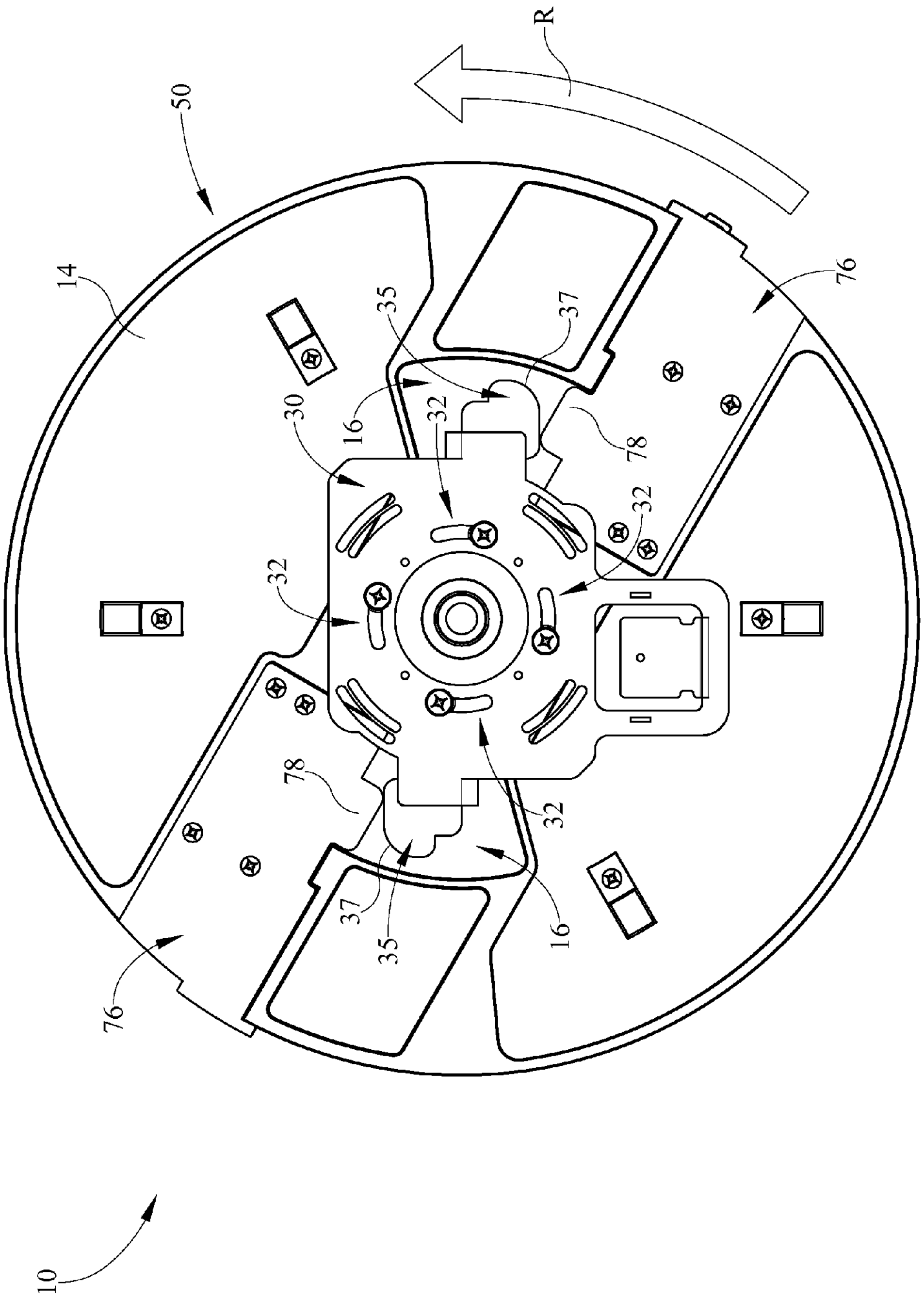
FIG. 5 is a top view of the exemplary mounting assembly in a first position.

Referring now to FIG. 5, a top view of the fixture assembly 10 is depicted in a first position. The bracket 30 is shown positioned over the fasteners 39 wherein the fasteners 39 are disposed in the circular portions 34 of the key apertures 32. In the figure depicted, the bracket 30 is stationary while the fasteners 39 and the fixture housing 50, including the backplate 14, rotate relative to the bracket 30. The rotation arrow R indicates the direction of rotation of the fixture housing 50 and backplate 14 so that at the position shown, the tabs 35 are near engagement with the cover plate tabs 78.

Referring now to FIG. 6, the fixture housing 50 is rotating further along in the direction of the rotation shown in FIG. 5 to a second position. As shown, one of the cover plates 76 is cutaway to reveal the interrelation between the bracket tab 35 and the slider assembly 40. Specifically, the slider assembly 40 includes a fixed end 44 which is connected to the slider fastening assembly 42 (FIG. 2) of the fixture housing or casting 50. This fixed end 44 is fastened to the assembly 42 by at least one fastener and further includes a spring 46 extending between the fixed end structure 44 and the slider or plunger 48. The slider 48 has a curved cam or follower surface 49 which engages the alternate one of a cam or follower surface 37 on the tab 35. As the plunger 48 engages the tab 34 along the cam and follower surfaces, the plunger 48 is pushed toward the fixed end 44 and such movement is indicated by the arrow in the figure. This movement continues as the fixture casting 50 rotates relative to the bracket 30.

Figure 7:
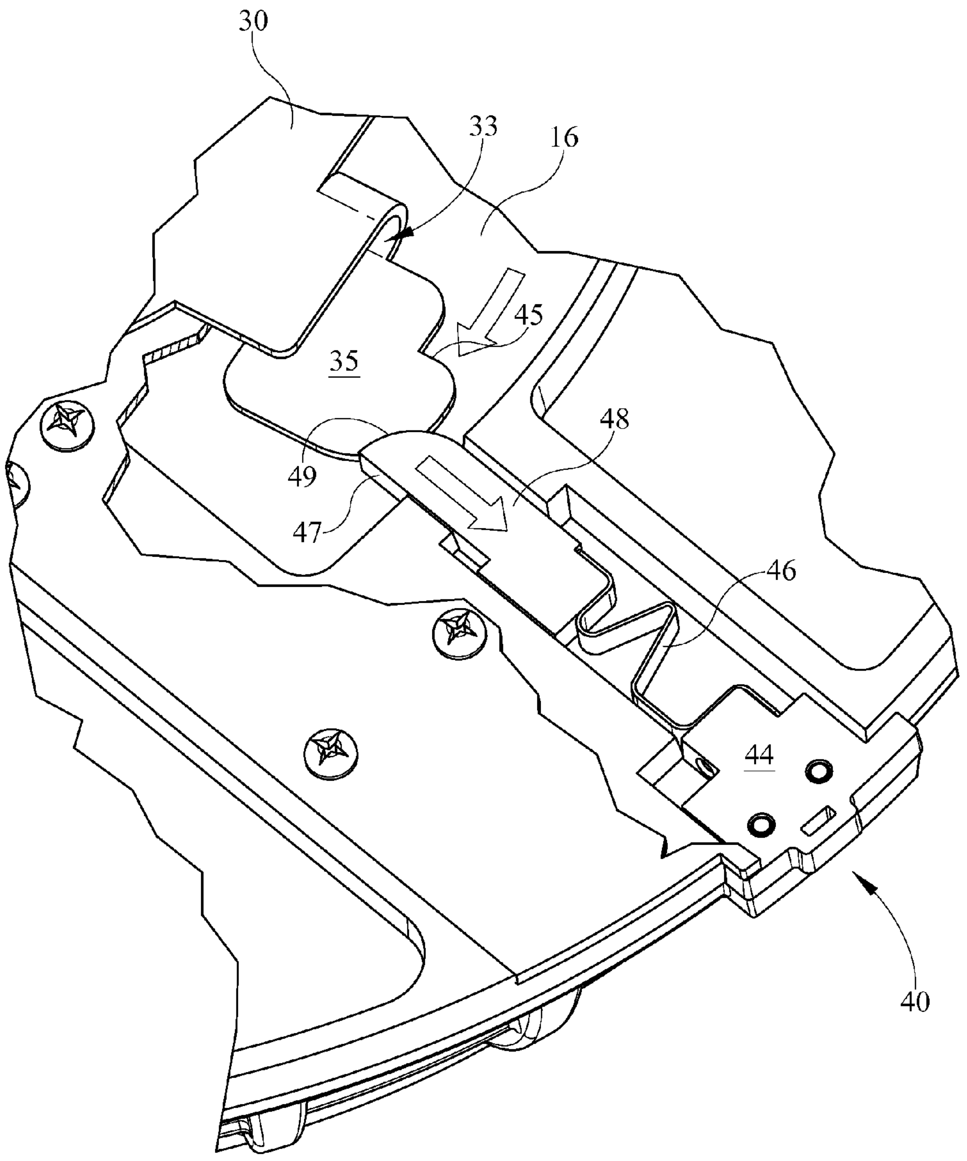
FIG. 7 is a detail view of the slider assembly with a cover plate cut-away.

Referring now to FIG. 7, the slider assembly 40 and one tab 35 of the bracket 30 is shown in perspective view in the second position depicted in FIG. 6. The tab 35 is engaging the plunger 48 as described with respect to FIG. 6 and the plunger 48 moves toward the fixed end structure 44 of the slider assembly 40. This all occurs as the fixture casting 50 is rotated in the direction shown in FIG. 6 which causes the relative movement of the tab 35 shown in FIG. 7. These figures also depict the functionality of the cavity or recess 16 in the backplate 14 which allows positioning of the plunger 48 and tab 35 to move therein. Also shown, the tab 35 includes a linear surface 45 and the plunger 48 includes a linear surface where in the two surfaces are parallel and form a lock when engaged. The engaged position inhibits movement of the tab 35 relative to backplate 14 in a direction opposite the depicted directional arrow.

Figure 8:
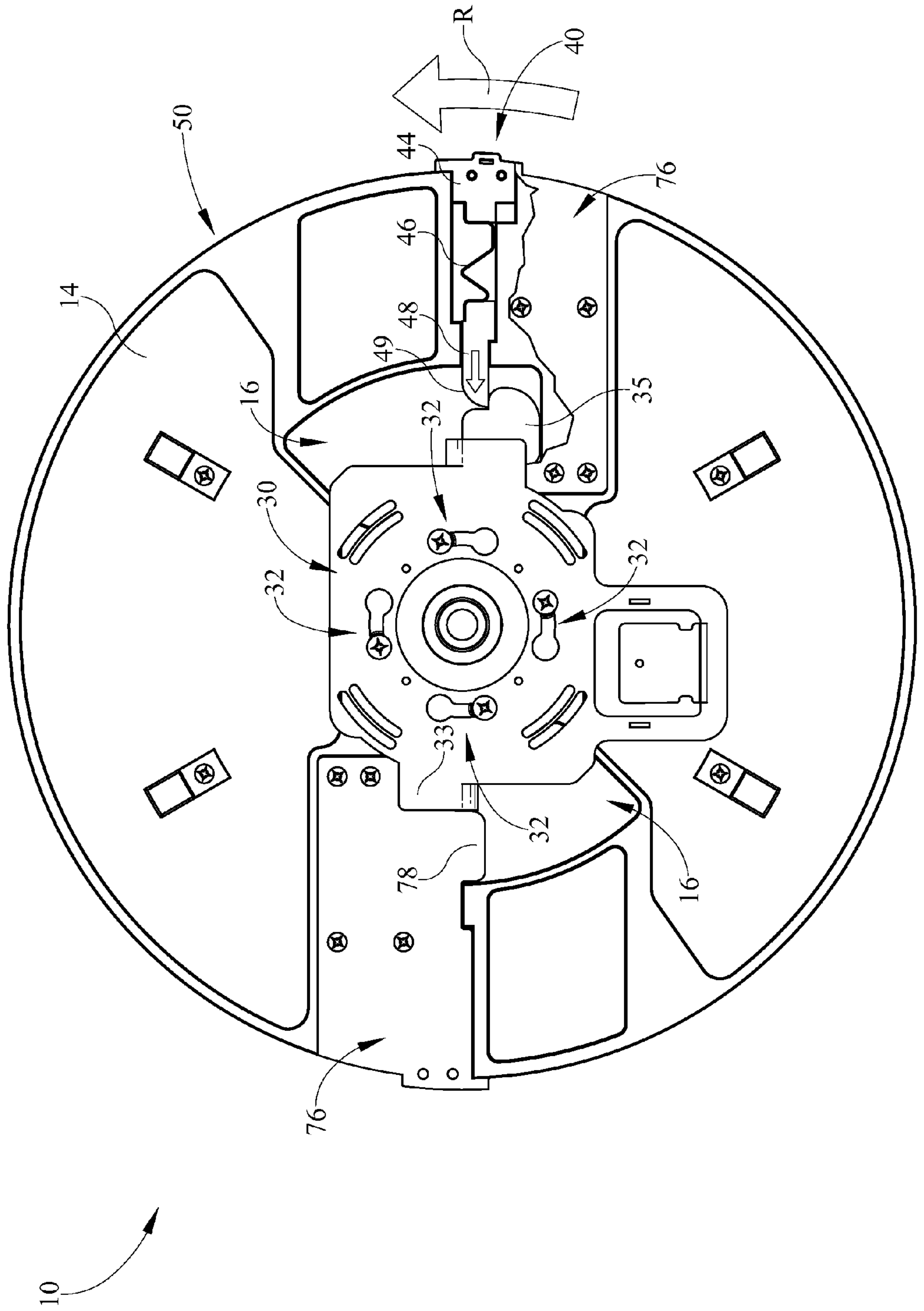
FIG. 8 is a top view of the exemplary mounting assembly in a third position wherein the mounting assembly is locked; and, FIG. 9 is a top view of an exemplary mounting assembly wherein the slider assembly is moved to the mounting bracket rather than the fixture.

Referring now to FIG. 8, a top view of the mounting assembly 10 is depicted wherein the fixture is in a third position and one of the cover plates 76 is cutaway to reveal the engagement between the tab 35 and slider assembly 40. As depicted, the tab 35 has moved past the plunger 48 so that a first flat surface of the plunger 48 is engaging a second parallel flat surface of the tab 35. These surfaces form the locking structure of the mounting assembly 10 and lock the fixture housing 50 relative to the bracket 30. The spring 46 is expanded relative to its position shown in FIGS. 6 and 7 so that the plunger 48 extends to its normal position in the cavity 16 of the backplate 14. As shown on the opposite side of the backplate 14, the alternative cover plate is shown in a position which is not cutaway. A portion of the cover plate 78 is received by the receiving portion 33. On this side of the bracket, the cover plate 76 is shown disposed on the upper surface of tab 35 so that the weight of the casting or housing 50 is supported by the bracket 30.

In this position, the casting or housing 50 cannot be rotated in the clockwise direction until the slider assembly 40 disengages the tab 50 from the position shown. In order to do this, and with brief reference to FIG. 3, the fasteners of the slider fastening assembly 42 are removed from the mounting assembly 10 in order to release the slider assembly 40. The slider assembly 40 is removed at least partially and the plunger disengages the tab 35. In this arrangement, the fixture 12 may be rotated some preselected distance related to the arc length of the keyed aperture 32 (FIG. 8) and the fixture removed from the bracket 30.

Figure 9:
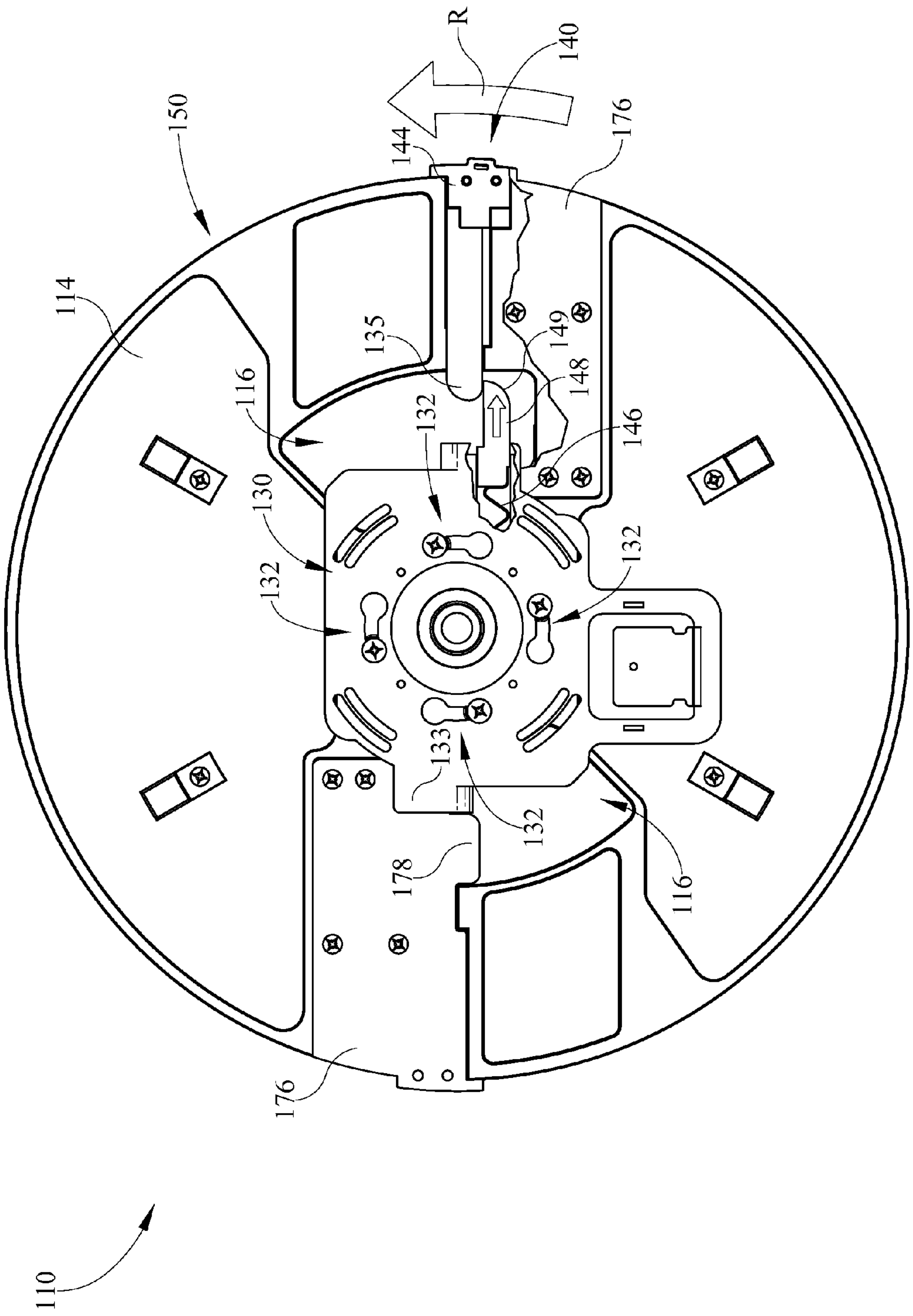

Referring now to FIG. 9, an alternate embodiment is depicted wherein the slider assembly is mounted to the bracket 130 and a fixed structure 144 is positioned on the housing 50. By unscrewing this fixed structure 144, the slider assembly 140 can be disengaged for removal of the fixture from the ceiling or wall. In effect, this provides the opposite structure of the previous embodiments described such that the movable portion is on the bracket and the fixed portion is on the housing or casting.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A luminaire mounting assembly, comprising:
- a mounting bracket having at least one keyed aperture;
- said mounting bracket having one of a slider assembly and at least one tab;
- a fixture housing having the other of a slider assembly and said at least one tab, said slider assembly movable between a first fixture position and a second fixture position, said slider assembly having:
  - a fixed element;
  - a plunger movable relative to the fixed element;
  - said plunger biased toward a first plunger position and engaging said at least one tab;
- said plunger movable to a second plunger position to pass said at least one tab.

2. The luminaire mounting assembly of claim 1, said slider assembly being spring biased to said first plunger position and movable to said second plunger position.

3. The luminaire mounting assembly of claim 1 wherein said tab engages said plunger at said first plunger position and forces said plunger to said second plunger position.

4. The luminaire mounting assembly of claim 3, wherein said tab locks said plunger at a third plunger position.

5. The luminaire mounting assembly of claim 1 further comprising a junction box connected to said mounting bracket.

6. The luminaire mounting assembly of claim 1 further comprising a cover plate which covers said slider assembly.

7. A luminaire mounting assembly, comprising:
- a back plate disposed on a luminaire fixture;
- a mounting bracket movable relative to said back plate and having tabs extending from said mounting bracket;
- a slider assembly connected to said luminaire fixture, said slider assembly having a fixed end and a slider, said slider having a normal position and at least one biased position;
- one of said mounting bracket and said back plate movable to engage said slider in said normal position and urging said slider toward said biased position;
- said tab movable to a locked position when said tab rotates beyond said slider and said slider locks said mounting bracket in an operating position.

8. The luminaire mounting assembly of claim 7, said slider assembly having a biasing spring extending between said slider and said fixed end.

9. The luminaire mounting assembly of claim 7, said slider having a camming surface.

10. The luminaire mounting assembly of claim 9, said tab having a follower surface engaging said camming surface.

11. The luminaire mounting surface of claim 7 further comprising a receiving portion on said mounting bracket.

12. The luminaire mounting surface of claim 11 further comprising a cover plate disposed over said slider assembly.

13. The luminaire mounting surface of claim 12 wherein a portion of said cover plate is received in said receiving portion.

14. A luminaire mounting assembly, comprising:
- a back plate disposed on a luminaire fixture, said back plate movable relative to a mounting bracket;
- said mounting bracket having at least one slider assembly;
- said luminaire having a tab wherein said at least one slider assembly engages said tab and compresses from a first position and to a second position;
- said slider assembly passing said tab in said second position with rotation of said slider assembly past said tab.

15. The luminaire mounting assembly of claim 14 wherein said tabs continue rotating until said slider moves to a locked position.

16. The luminaire mounting assembly of claim 15 wherein said tab and said slider have parallel locking surfaces.

17. The luminaire mounting assembly of claim 14, said mounting bracket having a junction box connected thereto.

18. The luminaire mounting assembly of claim 14, said mounting bracket tab engaging a slider.

19. The luminaire mounting assembly of claim 14 further comprising a cover disposed over said slider assembly and received by a receiving portion of said mounting bracket.

* * * * *